United States Patent
Iguchi

(10) Patent No.: US 7,053,897 B2
(45) Date of Patent: May 30, 2006

(54) DATA ANALYSIS METHOD AND APPARATUS THEREFOR

(75) Inventor: Yasuhiko Iguchi, Tokyo (JP)

(73) Assignee: Agilent Technologies, Inc., Palo Alto, CA (US)

( * ) Notice: Subject to any disclaimer, the term of this patent is extended or adjusted under 35 U.S.C. 154(b) by 512 days.

(21) Appl. No.: 10/464,624

(22) Filed: Jun. 18, 2003

(65) Prior Publication Data

US 2004/0002827 A1    Jan. 1, 2004

(30) Foreign Application Priority Data

Jun. 28, 2002   (JP) ............................. 2002-190201

(51) Int. Cl.
*G06T 11/00* (2006.01)

(52) U.S. Cl. ..................................... 345/440

(58) Field of Classification Search ................ 345/440; 715/503, 504
See application file for complete search history.

(56) References Cited

U.S. PATENT DOCUMENTS

| | | | |
|---|---|---|---|
| 5,623,591 A * | 4/1997 | Cseri ........................... 715/762 |
| 5,966,716 A * | 10/1999 | Comer et al. ................ 707/203 |
| 6,112,209 A * | 8/2000 | Gusack ........................ 707/101 |
| 6,138,130 A * | 10/2000 | Adler et al. ................. 715/503 |
| 6,626,736 B1 * | 9/2003 | Tsujimura et al. .............. 451/9 |

FOREIGN PATENT DOCUMENTS

| EP | 1211624 | 6/2002 |
|---|---|---|
| JP | 11-163063 | 6/1999 |

OTHER PUBLICATIONS

European Search Report dated Jun. 1, 2005.
Barth, Claire, "Computers & Accounting Hardware/Software Reviews," No. 10, pp. 16-17, Management Accounting, Apr. 1990.
DeStefano, Dan, "Control Excel from Visual Basic," pp. 55-60, Test & Measurement World, Apr. 1997.

* cited by examiner

*Primary Examiner*—Almis R. Jankus

(57) ABSTRACT

A data analysis method, apparatus, and storage medium having computer readable program instructions embodied therein for use on a spreadsheet software having a plurality of cells displayed as a two-dimensional table on a computer including assigning to a first cell a definition of array representation data including a single array or multiple arrays of data, displaying to the first cell a first array display button, and selectively displaying the array representation data in a graphical or table format using an array data display device when the array display button is selected.

14 Claims, 6 Drawing Sheets

| Lot ID | Wafer ID | Die X | Die Y | Resistance | $I_D V_G$ | $V_{TH}$ | $I_D V_D$ | $I_{DS}$ |
|---|---|---|---|---|---|---|---|---|
| L01 | W01 | 1 | 1 | 1.2 E+6 |  | 1.4 |  |  |
| L01 | W01 | 9 | 1 | 1.3 E+6 |  | 1.7 |  |  |
| L01 | W01 | 5 | 5 | 1.1 E+6 |  | 1.5 |  |  |
| L01 | W01 | 1 | 9 | 1.2 E+6 |  | 1.2 |  |  |
| L01 | W01 | 9 | 9 | 1.2 E+6 |  | 1.1 |  |  |
| L01 | W05 | 1 | 1 | 1.2 E+6 |  | 1.3 |  |  |
| L01 | W05 | 9 | 1 | 1.3 E+6 |  | 1.8 |  |  |
| L01 | W05 | 5 | 5 | 1.2 E+6 |  | 1.5 |  |  |
| L01 | W05 | 1 | 9 | 1.4 E+6 |  | 1.8 |  |  |
| L01 | W05 | 9 | 9 | 1.2 E+6 |  | 1.7 |  |  |

Fig. 4

DATA ANALYSIS METHOD AND APPARATUS THEREFOR

BACKGROUND OF THE INVENTION

1. Field of the Invention

The present invention relates to data analysis of semiconductor tests using a computer and, more particularly to a technique for a software program executed by a computer that combines (1) the measuring results obtained as a combination of arrays from a measuring apparatus and (2) the measuring results obtained as scalar representation data from the measuring apparatus and analyzes thereof.

2. Discussion of the Background Art

When an IC (integrated circuit), whether in a die on a wafer or a package form, referred to hereinafter as measured elements and DUT (device under test), are measured a variety of parameters are set and data are collected. For example, in the semiconductor measuring system described in Japanese Patent Application Publication No. H11[1999]-163,063, a variety of parameters are provided for a test spec 7d and vast amounts of measured data are obtained and evaluated. A combined Agilent 4072 Semiconductor Parameter Tester manufactured by Agilent Technologies Inc. and Semiconductor Process Evaluation Core Software (SPECS) manufactured by the same company or the Agilent 4155 Semiconductor Parameter Analyzer manufactured by Agilent Technologies Inc. and the like may be used for these measurements.

When the current/voltage (I-V) characteristics are measured relative to each of the DUTs under specific conditions using measuring apparatuses, the data are obtained as multiple combinations of arrays that indicate the voltage value relative to the current value under one or more conditions for each DUT and are stored in a file in a format desired by the user. The stored data are calculated using a dedicated data analysis program or Excel® or other all-purpose spreadsheet program. As a result, $V_{TH}$ and other feature values are extracted from the respective array data.

However, when processing was carried out for the obtained array data using a dedicated data analysis program, complicated operations using the array data were needed such that the program had to be revised to handle the quantity of data being processed. Also, the cost of the program increased when a dedicated data analysis program was provided that could handle the data flexibly such that the data were not controlled by the size of the array and the number of combinations of the arrays. Additionally, when the need arose to revise an algorithm used for extracting a feature value during analysis, recompiling had to be carried out and it could not be flexibly revised.

On the other hand, when arithmetic operations were carried out using an all-purpose spreadsheet program, feature value extraction from the multiple array data such as the aforementioned I-V characteristics were executed for each individual spreadsheet. Also, the extracted feature values were inserted in a two-dimensional table, that is, the main spreadsheet which had been displayed for each DUT along with the results of the other measurement items, and were evaluated. However, inserting the feature values obtained for each of the individual spreadsheets mentioned above in a cell on the main spreadsheet is a manual operation which is cumbersome and time-consuming. In addition, the process of debugging between the main spreadsheet and each of the spreadsheets used for feature value extraction is not easily done without sufficient specialized knowledge. Also, when the prior-art all-purpose spreadsheet program was used, there was no function to easily display the array or perform operations for it unless expanding the array to another spreadsheet.

SUMMARY OF THE INVENTION

It is an object of the present invention to address the problems as indicated above and to provide a data analysis environment that comprehensively handles, expresses, and processes measurement items expressed in a single measurement value (scalar representation data) and items expressed in an array of measured values (array representation data).

It is another object of the present invention to provide a data analysis method that provides for the extraction, display, verification and evaluation of feature values from data items expressed in arrays of measurement values of measurement items on a spreadsheet where items expressed in a single measurement value are expressed as measurement items.

It is yet another object of the present invention to provide a mechanism that can be easily handled in the aforementioned data analysis environment without expanding the array data to another part of the spreadsheet and incorporating them.

The present invention provides a method and apparatus for analysis that can comprehensively handle, express, and process measurement items expressed in a single measurement value (scalar representation data) and items expressed in arrays of measurement values (array representation data) in data analysis.

The present invention provides a data analysis method for use on a spreadsheet software having a plurality of cells displayed as a two-dimensional table on a computer comprising (1) assigning to a first cell a definition of array representation data including a single array or multiple arrays of data; (2) displaying to the first cell a first array display button; and (3) selectively displaying the array representation data in a graphical or table format using an array data display device when the array display button is selected.

The present invention comprises an embodiment that comprises (1) assigning to a second cell an expression containing a feature value extraction function for array representation data assigned to the first cell; and (2) selectively displaying and assigning to the second cell an operation result for an expression containing the feature value extraction function.

An embodiment of the present invention is a data analysis apparatus that is provided with (1) a spreadsheet definition device that assigns a definition of array representation data to a first cell on a spreadsheet software having a plurality of cells displayed as a two-dimensional table on a computer; and (2) an array data display device that displays to the first cell a first array display button and selectively displays the array representation data in graphical or table format when the array display button is selected.

Here, the aforementioned spreadsheet definition device is provided with functionality that assigns to the second cell on the aforementioned spreadsheet an expression that contains a feature value extraction function for the array representation data assigned to the aforementioned first cell. The aforementioned data analysis apparatus is also provided with an array data operation device that executes operations for the expression that contains the aforementioned feature value extraction function in the aforementioned second cell. The aforementioned array data display device displays a second array display button when the results of an expression which has been assigned to the aforementioned second cell, and has a function that displays numeric values when the operation results are scalar representation data.

An embodiment of the present invention provides a data analysis method which, when data are displayed to the first cell on the spreadsheet, displays a numeric value when the data assigned to the aforementioned first cell are scalar representation data and displays an array display button when the data assigned to the aforementioned first cell are array representation data.

There is an embodiment in which the data for measurement items expressed in a single measurement value are contained in the aforementioned scalar representation data and the data for measurement items expressed in a single array or multiple arrays of measurement values as measurement items are contained in the aforementioned array representation data; an embodiment in which the array representation data assigned to the aforementioned first cell are displayed in another window in table form or graph form; and an embodiment in which, when an expression that contains a feature value extraction function for the array representation data that have been assigned to the first cell is described in the second cell, the function is calculated and displayed as a numeric value when the calculation results are scalar representation data and an array display button is displayed when the aforementioned calculation results are array representation results.

The present invention also provides a computer program for executing and implementing any of the data analysis methods and data analysis apparatus mentioned above.

BRIEF DESCRIPTION OF THE DRAWINGS

FIG. 4 is an example of a display for a spreadsheet of the present invention.

DETAILED DESCRIPTION OF THE INVENTION

In the present invention, particular attention should be paid to the fact that data analysis carried out for each DUT is divided into two types: (1) scalar representation data (hereinafter also referred to as scalar data) having only a single measurement value (for example, a resistance value when specified terminals are opened) of measurement items or information data for DUT lot/wafer/die, and (2) array representation data (hereafter sometimes referred to as array data) that are expressed as a single array or multiple arrays of measurement items. When these results are arranged and expressed as a two-dimensional table, e.g., a spreadsheet on a computer, an environment is provided in which the measurement items can be displayed and processed comprehensively. More specifically, the array representation data takes single or multiple measurement values obtained for a combination of a single setting value or multiple setting values and retains and handles the features of the measurement items by turning them into data sets. The results can be easily arranged and displayed.

Thus, in the present invention, the array representation data are represented as a single cell in the spreadsheet in the main spreadsheet. Accordingly, a definition of the array representation data assigned to a cell is stored in that cell. By selecting that cell, the user can obtain array data display or array graph display. The array representation data that are related by intuitive operations are referenced and analyzed all the while taking the scalar representation data for each DUT on the main spreadsheet into consideration.

In the analytical environment provided by the present invention, a feature value extraction function that carries out statistical operations and a variety of other operations is prepared for the array representation data represented in the designated cell. Feature values calculated from the designated array representation data can be displayed in the desired cell by using the feature value extraction function in the expression in the definition of the target cell. Therefore, the array representation data and the feature values for these can be easily referenced so that the analytical operations to be executed are significantly simplified.

As an example of the present invention, a spreadsheet in which array representation data have been abstracted and assigned to a cell can be easily understood by calling it a main spreadsheet during analysis. In the present invention, however, this is by no means restricted to cases in which only the main spreadsheet during analysis abstracts the array representation data and assigns them to a cell.

Figure 1:
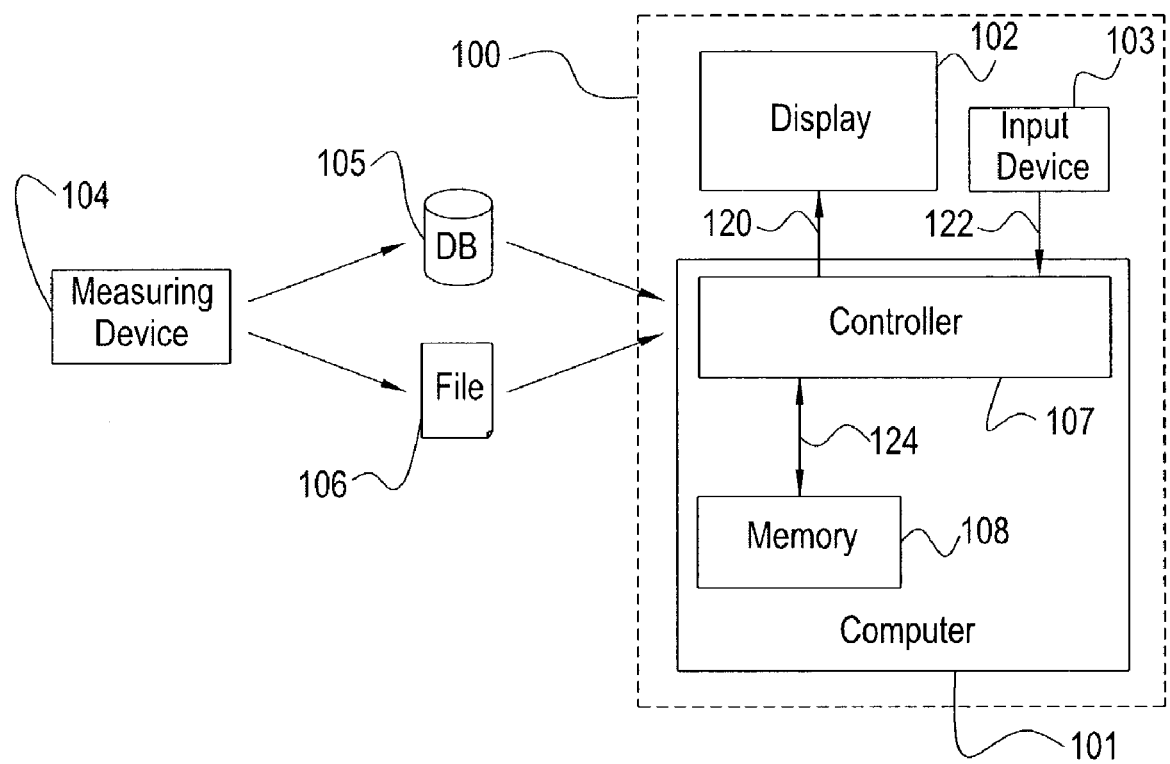
FIG. 1 is a block diagram of a preferred embodiment of the present invention.
Figure 2:
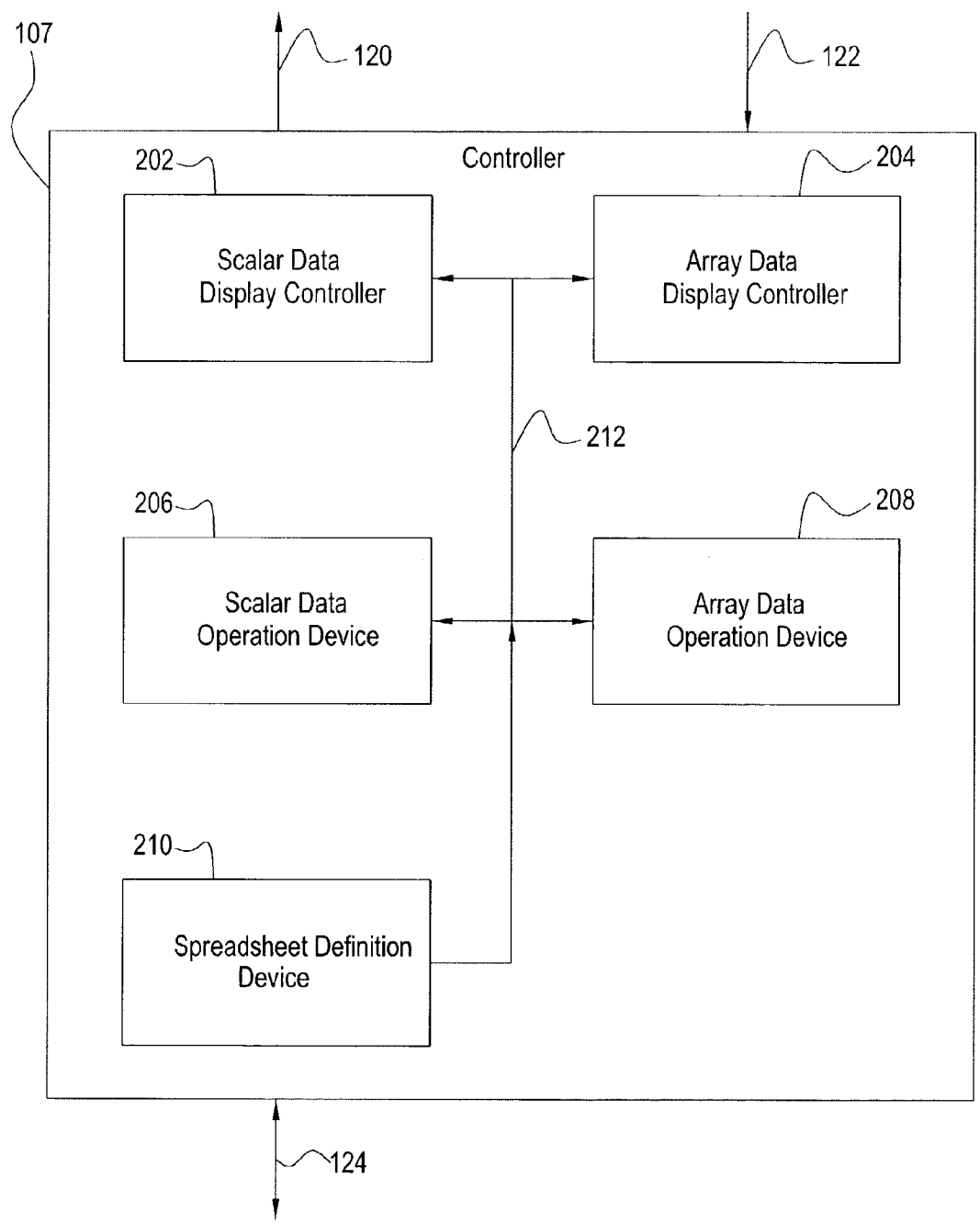
FIG. 2 is a block diagram of controller 107 in FIG. 1.
Figure 3:
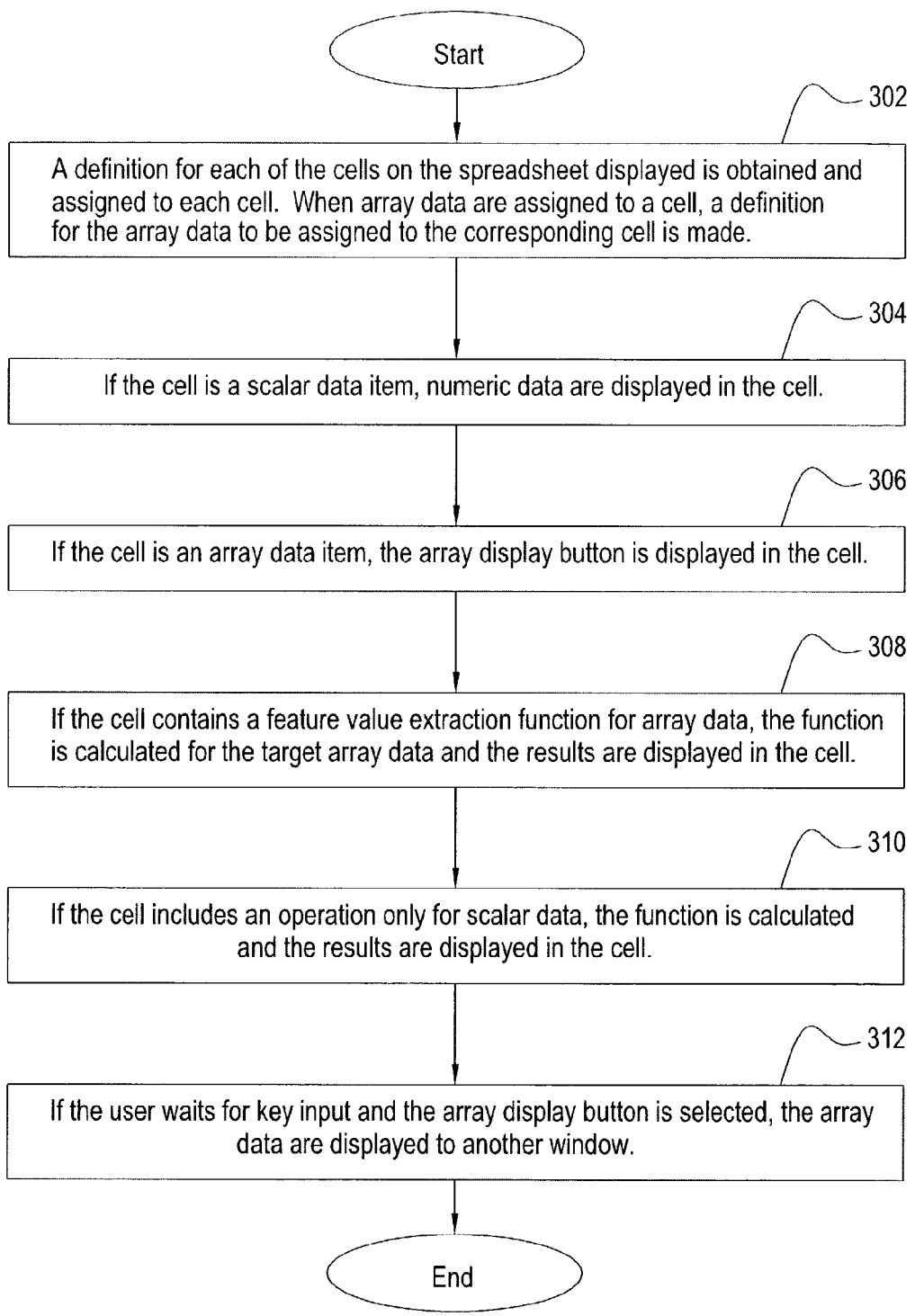
FIG. 3 is a flowchart indicating the operations involved in an examplary embodiment of the present invention.

Data analysis apparatus 100, which is a exemplary suitable embodiment of the present invention, is shown in FIGS. 1 through 3. As indicated in FIG. 1, data analysis apparatus 100 is provided with a computer 101, a display 102, and an input device 103. Computer 101 is provided with a storage 108 including memory and a hard disk that stores a variety of programs and data, as well as a controller 107 that executes system control programs, user test programs, and a variety of other programs and includes functionality for controlling the display and the input device. Display 102 comprises a CRT or a liquid crystal display and the like. Computer 101 is provided with functionality for receiving data obtained from a measuring apparatus 104 and stored in a database 105 or a file 106. Arrows 120, 122 and 124 indicate the flow of data.

As indicated in FIG. 2, controller 107 is provided with a spreadsheet definition device 210, a scalar data display controller 202, an array data display controller 204, a scalar data operation device 206, and an array data operation device 208. Spreadsheet definition device 210 is provided with functionality that governs the input for the definition of a cell on the spreadsheet. Scalar data display controller 202 is provided with functionality for controlling the display of the scalar data on the spreadsheet. The array data display controller 204 is provided with functionality for displaying and controlling the array data by a control button, in table or graph form. The scalar data operation device 206 is provided with functionality for operating and controlling a cell for the scalar data or an expression that refers to a cell for the scalar data. The array data operation device 208 is provided with functionality for operation and control when a formula has been described in a cell for array representation data defined in the cell.

The controller 107 operates to handle a cell in a spreadsheet according to the flowchart depicted in FIG. 3. In step 302, a definition for each of the cells in the spreadsheet displayed is obtained and assigned to each of the cells using the spreadsheet definition device 210. The process for obtaining the definition from a cell using the spreadsheet definition device 210 may be one in which the user inputs the definition of a cell, as well as one which reads the definition of a cell which has been stored in storage 108. Further, when array representation data are assigned to a cell, the definition of array representation data that are to be assigned to the cell is coordinated and stored in storage 108.

When the cell displayed is a scalar data item, the numerical data are displayed to the cell in step 304 of FIG. 3. When the cell displayed is an array data item, the array display button is displayed in the cell at step 306.

If an expression defined in the cell displayed contains a feature value extraction function for array data, the function is calculated for the array data to be calculated and the results are displayed to the cell in step 308.

A numeric value or an array display button is displayed depending on whether the results are scalar data or array data as a means of displaying the results to the cell. Next, if the cell displayed comprises an operation only for scalar data, the operation is carried out and the results are displayed to the cell in step 310. After the display has been made to the cell as indicated above, controller 107 stands by for key input. When the array display button, displayed in step 306, is pushed, the array data are displayed in another window in step 312.

Further, the display configuration for array data may comprise a display means that displays in table form, graph form or both, and an additional display means that displays the remainder from one of the tables or graphs displayed.

Figure 5:
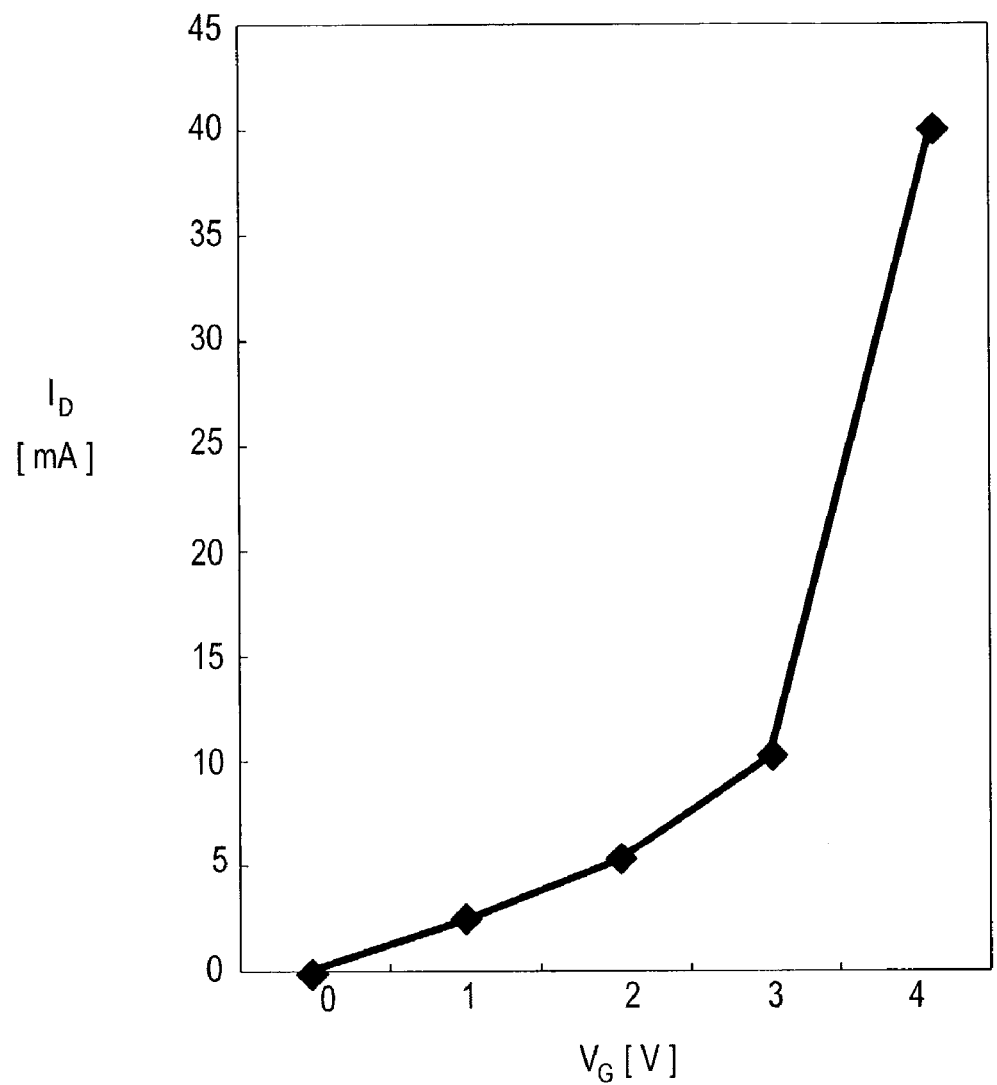
FIG. 5 is an example of a graph display that is indicated when button 410 in FIG. 4 is selected.
Figure 6:
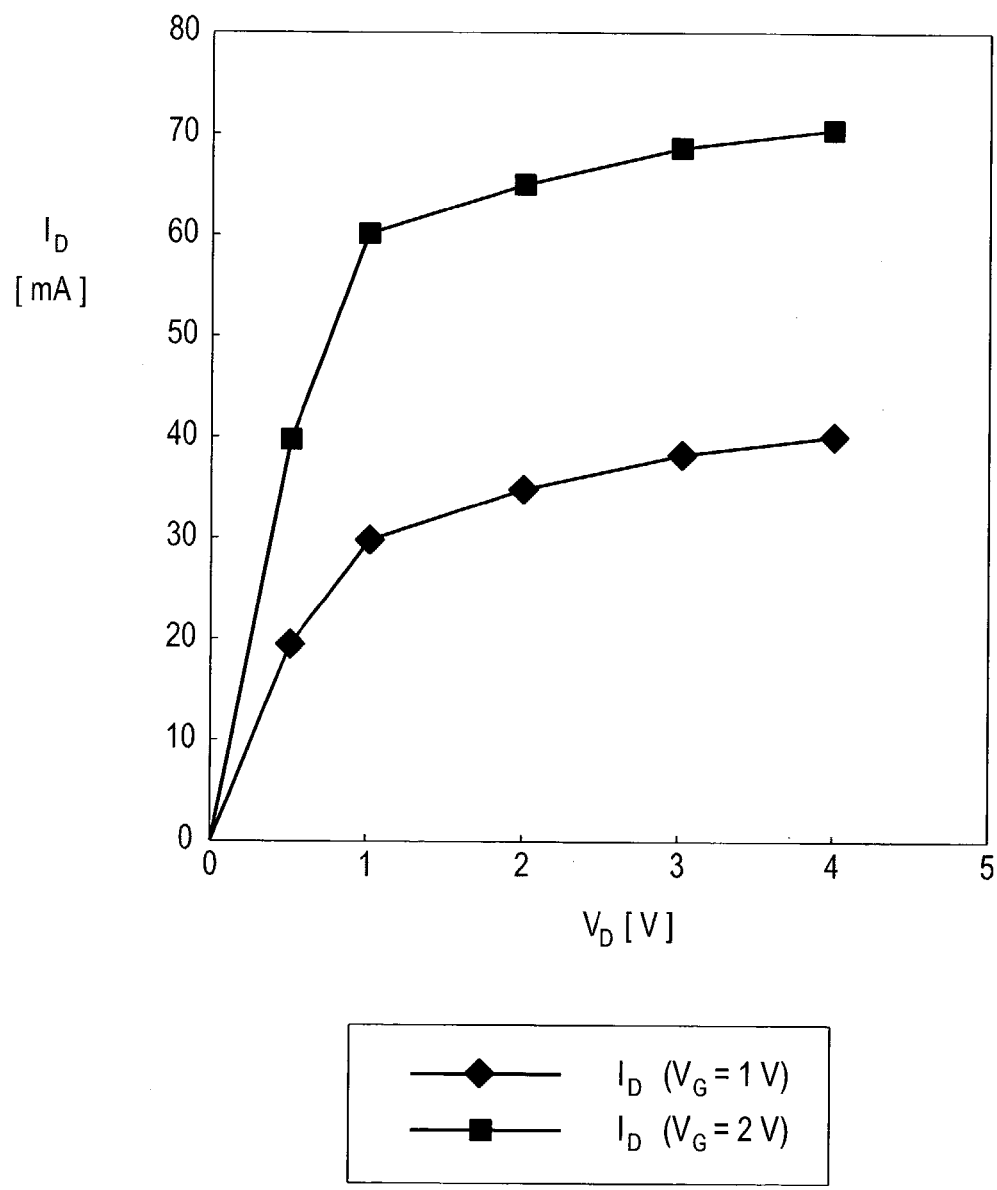
FIG. 6 is an example of a graph display that is indicated when button 412 in FIG. 4 is selected.

Next, there is provided a specific description of the display indicated in FIGS. 4–6. FIG. 4 is an example of the main spreadsheet that is displayed using data analysis apparatus 100 of the present invention. Display window 400 is a display window for the spreadsheet. The table displayed for the rows is provided with a title line 401 that displays the name of an item displayed for each column and a data display line 402.

The following items are displayed for the columns in the exemplary window 400:

(1) information data 403 for specifying measurement objects like the lot ID;

(2) measurement results of scalar data 404 like the resistance value between terminals;

(3) array expression data containing a single two-dimensional array like measurement result of $I_D V_G$ characteristic 405;

(4) array expression data containing multiple two-dimensional arrays like measurement result of $I_D V_D$ characteristic 407;

(5) voltage $V_{TH}$ of scalar data 406 as the results of feature value extraction for single two-dimensional array data 405; and (6) drain current $I_{DS}$ 408 in the saturated regions for each voltage $V_G$ that constitutes array representation data for feature values as the results of feature value extraction for multiple two-dimensional array data 407.

Although it is not shown in the figure, it is also contained in the invention that extracting feature value from specified cells and displaying the result to another cell, of which the scalar data specified for extracting contains array representation data once extracted as feature value.

An array display button is displayed in each of the cells for $I_D V_G$ characteristic 405. For example, when the user clicks an array display button 410 for an $I_D V_G$ characteristic cell for a DUT in which the lot ID is L01, the wafer ID is W05, the die X coordinate is 9 and the die Y coordinate is 9, the data display which is indicated in Table 1 (shown below) or the graph display in FIG. 5 is displayed in another window.

TABLE 1

| $V_G$ [V] | $I_D$ [mA] |
|---|---|
| 0 | 0 |
| 1 | 2 |
| 2 | 5 |
| 3 | 10 |
| 4 | 40 |

Likewise, when the user clicks the array display button 412 for the $I_D V_D$ characteristics which contains multiple two-dimensional array data, the data display indicated in Table 2 (shown below) or the graph display indicated in FIG. 6 is displayed in another window.

TABLE 2

| $V_D$ [V] | $I_D$ ($V_G$ = 1V)[mA] | $I_D$ ($V_G$ = 2V)[mA] |
|---|---|---|
| 0.0 | 0 | 0 |
| 0.5 | 20 | 40 |
| 1.0 | 30 | 60 |
| 2.0 | 35 | 65 |
| 3.0 | 38 | 68 |
| 4.0 | 40 | 70 |

Even when the user pushes (i.e., selects) the array display button for column $I_{DS}$ 408, which has feature value extraction results containing array representation data, data display or graph display for the array data is carried out as indicated above.

A preferred embodiment of the present invention has been described hereinabove. However, these are only examples used for the sake of explanation and a variety of variants should be appreciated by a person of ordinary skill in the art. For example, when the contents of the cell comprises array representation data, a variant in which characters and symbols are displayed to the cell instead of the button, a variant in which special colors are displayed in the cell, and a variety of other display variants are possible as well. A variety of configurations other than selecting using a mouse can be used as a method for indicating a user selection for displaying the contents of the array representation data from a cell. In the discussion above, the $I_D V_D$ characteristic 405 was used to represent a single two-dimensional array and the $I_D V_D$ characteristic 407 was used to represent multiple two-dimensional array data. However, regarding the implementation of the present invention, an embodiment that processes these data by decomposing or integrating them and treating them as one-dimensional or multi-dimensional data is included in the scope of the present invention.

As discussed above, in accordance with the present invention, items expressed by a single measurement value and items that are expressed as arrays of measurement values are integrated and handled in data analysis. Thus, there is provided an analytical environment for representing and processing the items. In addition, feature values can be extracted, displayed, verified, and evaluated from items expressed by an array of measurement values as measurement items and single measurement values as measurement items on a spreadsheet are displayed. Therefore, the user can efficiently analyze and evaluate data that contain an array representation. In addition, since array representation data do not need to be expanded to another part of the spreadsheet and incorporated there, the user can easily make analyses and evaluations which include array representation data.

I claim:

1. A data analysis method for use on a spreadsheet software having a plurality of cells displayed as a two-dimensional table on a computer, comprising:
assigning to a first cell a definition of array representation data including a single array or multiple arrays of data;
displaying to said first cell a first array display button; and
selectively displaying said array representation data in a graphical or table format using an array data display device when said first array display button is selected.

2. The method of claim 1, further comprising:
assigning to a second cell an expression containing a feature value extraction function for array representation data assigned to said first cell; and
selectively displaying and assigning to said second cell an operation result for an expression containing said feature value extraction function.

3. A data analysis apparatus comprising:
a spreadsheet definition device that assigns a definition of array representation data to a first cell on a spreadsheet software having a plurality of cells displayed as a two-dimensional table on a computer; and
an array data display device that displays to said first cell a first array display button and selectively displays said array representation data in graphical or table format when said array display button is selected.

4. The apparatus of claim 3, wherein said spreadsheet definition device is provided with a function that assigns to said second cell on said spreadsheet an expression containing a feature value extraction function for said array representation data assigned to said first cell; said analysis apparatus being provided with an array data operation device that calculates the expression containing said feature value extraction function in said second cell; said array data display device being provided with a function that displays a second array display button when a result of calculating an expression assigned to said second cell is array representation data and being provided with a function that displays a numeric value if said calculation result is a scalar representation data.

5. A data analysis method comprising:
displaying data to a first cell on a spreadsheet software having a plurality of cells displayed as a two-dimensional table on a computer that displays a numeric value when said data assigned to said first cell is scalar representation data; and
displaying an array display button when said data assigned to said first cell is array representation data.

6. The method of claim 5, wherein a data item expressed as a single measurement value is included in said scalar representation data and a data item expressed as a measurement value array is included in said array representation data.

7. The method of claim 5, wherein said array representation data assigned to said first cell are selectively displayed, in table or graphical form, in a separate window when said array representation data is selected.

8. The method of claim 5, wherein an expression containing a feature value extraction function for array representation data assigned to said first cell is described in a second cell, said function is calculated and displayed as a numeric value if a calculation result is scalar representation data and displayed as an array display button if said calculation result is array representation data.

9. A storage medium having computer readable program instructions embodied therein for spreadsheet data analysis, said storage medium comprising:
program instructions for assigning to a first cell a definition of array representation data including a single array or multiple arrays of data;
program instructions for displaying to said first cell an array display button; and
program instructions for selectively displaying said array representation data in a graphical or table format using an array data display device when said array display button is selected.

10. The storage medium of claim 9, further comprising:
program instructions for assigning to a second cell an expression containing a feature value extraction function for array representation data assigned to said first cell; and
program instructions for displaying or assigning to said second cell an operation result for an expression containing said feature value extraction function.

11. A storage medium having computer readable program instructions embodied therein for spreadsheet data analysis, said storage medium comprising:
program instructions for controlling a spreadsheet definition device to assign to a first cell on a spreadsheet a definition of array representation data; and
program instructions for controlling an array data display device to display to said first cell an array display button and selectively displays said array representation data in graphical or table format when said array display button is selected.

12. The storage medium of claim 11, further comprising program instructions for providing said spreadsheet definition device with a function that assigns to said second cell on said spreadsheet an expression containing a feature value extraction function for said array representation data assigned to said first cell; program instruction for providing said analysis apparatus with an array data operation device that calculates an expression containing said feature value extraction function in said second cell; wherein said array data display device being provided with a function that displays a new array display button when a result of calculating an expression assigned to said second cell are array representation data and being provided with a function that displays a numeric value if said calculation result is a scalar representation data.

13. The storage medium of claim 11, further comprising:
program instructions for displaying data to a first cell on a spreadsheet that displays numeric values when said data assigned to said first cell are scalar representation data; and
displaying an array display button when said data assigned to said first cell are array representation data.

14. A storage medium having computer readable program instructions embodied therein for spreadsheet data analysis, said storage medium comprising:
program instructions for displaying data to a first cell on a spreadsheet that displays numeric values when said data assigned to said first cell are scalar representation data; and
displaying an array display button when said data assigned to said first cell are array representation data.

* * * * *